United States Patent
Wentz et al.

(10) Patent No.: US 10,500,952 B2
(45) Date of Patent: Dec. 10, 2019

(54) TRANSFER CASE HAVING AN ACTUATOR ASSEMBLY WITH CAM FOLLOWER THAT IS MOLDED INTO A PLASTIC ACTUATOR STRUCTURE

(71) Applicant: BorgWarner Inc., Auburn Hills, MI (US)

(72) Inventors: Travis J. Wentz, Rochester, MI (US); Jagdish Daphal, Auburn Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 103 days.

(21) Appl. No.: 15/817,653

(22) Filed: Nov. 20, 2017

(65) Prior Publication Data

US 2019/0152316 A1    May 23, 2019

(51) Int. Cl.
| | | |
|---|---|---|
| *F16H 63/18* | (2006.01) | |
| *F16H 63/32* | (2006.01) | |
| *B60K 23/08* | (2006.01) | |
| *B60K 17/344* | (2006.01) | |
| *F16D 23/14* | (2006.01) | |
| *F16D 23/12* | (2006.01) | |

(52) U.S. Cl.
CPC ............ *B60K 23/08* (2013.01); *B60K 17/344* (2013.01); *F16H 63/18* (2013.01); *F16D 2023/123* (2013.01); *F16D 2023/141* (2013.01); *F16H 2063/328* (2013.01)

(58) Field of Classification Search
CPC .... F16H 63/18; F16H 63/32; F16H 2063/328; F16D 2023/123; F16D 2023/141
See application file for complete search history.

(56) References Cited

U.S. PATENT DOCUMENTS

| | | |
|---|---|---|
| 4,353,449 A | 10/1982 | Lamy et al. |
| 4,529,080 A | 7/1985 | Dolan |
| 5,027,672 A | 7/1991 | Salvatori et al. |

(Continued)

FOREIGN PATENT DOCUMENTS

| | | | |
|---|---|---|---|
| EP | 1566579 A2 | 8/2005 | |
| EP | 1650479 A1 * | 4/2006 | ............ F16H 63/32 |

(Continued)

*Primary Examiner* — David R Morris
(74) *Attorney, Agent, or Firm* — Harness, Dickey & Pierce, P.L.C.

(57) ABSTRACT

A transfer case having an actuator assembly with a plastic actuator structure and a cam follower. The actuator structure defines a sleeve structure, a fork structure and a follower mount. The sleeve structure defines a shaft aperture that extends longitudinally along an actuation axis. The fork structure extends radially outwardly from the sleeve structure and defines a U-shaped fork member having a pair of tines that are disposed about an engagement axis that is parallel to and radially offset from the actuation axis. The follower mount extends radially outwardly from the sleeve structure. The cam follower is formed of metal and is partly encapsulated in the plastic material of the actuator structure. The cam follower extends from the follower mount along a follower axis that is parallel to the actuation axis. The follower axis is rotated about the actuation axis relative to the engagement axis.

19 Claims, 10 Drawing Sheets

(56) References Cited

U.S. PATENT DOCUMENTS

| | | | |
|---|---|---|---|
| 5,412,024 A * | 5/1995 | Okada | C08K 3/0033 524/494 |
| 5,463,911 A * | 11/1995 | Knoedel | F16H 63/32 74/473.36 |
| 5,799,540 A | 9/1998 | Diehl et al. | |
| 5,826,462 A | 10/1998 | Schaefer | |
| 6,155,126 A | 12/2000 | Vogt et al. | |
| 6,164,151 A | 12/2000 | Dutson et al. | |
| 6,173,624 B1 | 1/2001 | Decker | |
| 6,230,577 B1 | 5/2001 | Showalter et al. | |
| 6,367,344 B1 | 4/2002 | Vogt et al. | |
| 6,619,153 B2 * | 9/2003 | Smith | F16H 63/32 74/337.5 |
| 6,830,142 B2 | 12/2004 | Weilant | |
| 6,941,833 B2 | 9/2005 | Showalter | |
| 7,059,210 B2 * | 6/2006 | Thiessen | F16H 3/0915 74/337.5 |
| 7,219,571 B2 | 5/2007 | McCrary | |
| 7,581,467 B2 * | 9/2009 | Peterman | F16H 63/18 74/473.37 |
| 7,942,075 B2 * | 5/2011 | Garabello | F16H 63/32 74/473.36 |
| 8,091,447 B2 * | 1/2012 | Garabello | F16H 63/18 74/473.1 |
| 8,413,537 B2 | 4/2013 | Garabello et al. | |
| 8,627,739 B2 * | 1/2014 | Tooman | F16H 63/3023 74/473.36 |
| 9,097,339 B2 * | 8/2015 | Skogward | F16H 63/32 |
| 9,447,873 B2 | 9/2016 | Pritchard | |
| 9,657,837 B2 | 5/2017 | Showalter | |
| 9,815,366 B2 | 11/2017 | Palazzolo et al. | |
| 2002/0139215 A1 * | 10/2002 | Smith | F16H 63/32 74/473.37 |
| 2004/0118233 A1 * | 6/2004 | Weilant | B60K 17/02 74/334 |
| 2004/0154425 A1 * | 8/2004 | Showalter | F16H 63/304 74/473.36 |
| 2005/0160848 A1 * | 7/2005 | Thiessen | F16H 3/0915 74/325 |
| 2006/0101932 A1 * | 5/2006 | McCrary | F16H 61/32 74/329 |
| 2007/0006673 A1 * | 1/2007 | Peterman | F16H 63/18 74/329 |
| 2007/0209466 A1 * | 9/2007 | Garabello | F16H 63/32 74/473.37 |
| 2008/0178700 A1 | 7/2008 | Harmos et al. | |
| 2009/0107279 A1 * | 4/2009 | Garabello | F16H 63/30 74/473.37 |
| 2009/0114050 A1 | 5/2009 | Garabello et al. | |
| 2010/0005917 A1 * | 1/2010 | Garabello | F16H 63/18 74/473.37 |
| 2011/0061487 A1 * | 3/2011 | Tooman | F16H 63/3023 74/473.36 |
| 2013/0000437 A1 * | 1/2013 | Skogward | F16H 63/32 74/473.37 |
| 2013/0125693 A1 | 5/2013 | Maitre et al. | |
| 2015/0159751 A1 * | 6/2015 | Pritchard | B60K 17/3467 475/150 |
| 2015/0176708 A1 * | 6/2015 | Showalter | F16H 63/304 74/335 |
| 2017/0152933 A1 * | 6/2017 | Drill | F16D 13/72 |
| 2017/0232839 A1 * | 8/2017 | Palazzolo | B60K 17/344 475/295 |
| 2018/0347694 A1 * | 12/2018 | Bender | F16H 63/32 |

FOREIGN PATENT DOCUMENTS

| | | | | |
|---|---|---|---|---|
| EP | 1655518 A1 * | 5/2006 | | F16H 63/18 |
| FR | 2668236 A1 * | 4/1992 | | F16H 63/32 |
| FR | 2779794 A1 | 12/1999 | | |
| FR | 2779796 A1 | 12/1999 | | |
| FR | 2803890 B1 * | 3/2002 | | F16H 63/18 |
| JP | S59218522 A | 12/1984 | | |
| WO | WO-2004079232 A1 * | 9/2004 | | F16H 63/32 |

* cited by examiner

TRANSFER CASE HAVING AN ACTUATOR ASSEMBLY WITH CAM FOLLOWER THAT IS MOLDED INTO A PLASTIC ACTUATOR STRUCTURE

FIELD

The present disclosure relates to a transfer case having an actuator assembly with a cam follower that is molded into a plastic actuator structure.

BACKGROUND

U.S. Patent Application Publication No. 2013/0125693 discloses a shift fork having a metal sleeve and a metal reinforcement that are encapsulated in a plastic material.

SUMMARY

This section provides a general summary of the disclosure, and is not a comprehensive disclosure of its full scope or all of its features.

In one form, the present disclosure provides a transfer case having an actuator assembly with an actuator structure and a cam follower. The actuator structure is unitarily and integrally formed of a plastic material. The actuator structure defines a sleeve structure, a fork structure and a follower mount. The sleeve structure defines a shaft aperture that extends longitudinally along an actuation axis. The fork structure extends radially outwardly from the sleeve structure and defines a U-shaped fork member having a pair of tines that are disposed about an engagement axis that is parallel to and radially offset from the actuation axis. The follower mount extends radially outwardly from the sleeve structure. The cam follower is formed of metal and is partly encapsulated in the plastic material of the actuator structure. The cam follower extends from the follower mount along a follower axis that is parallel to the actuation axis. The follower axis is rotated about the actuation axis relative to the engagement axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
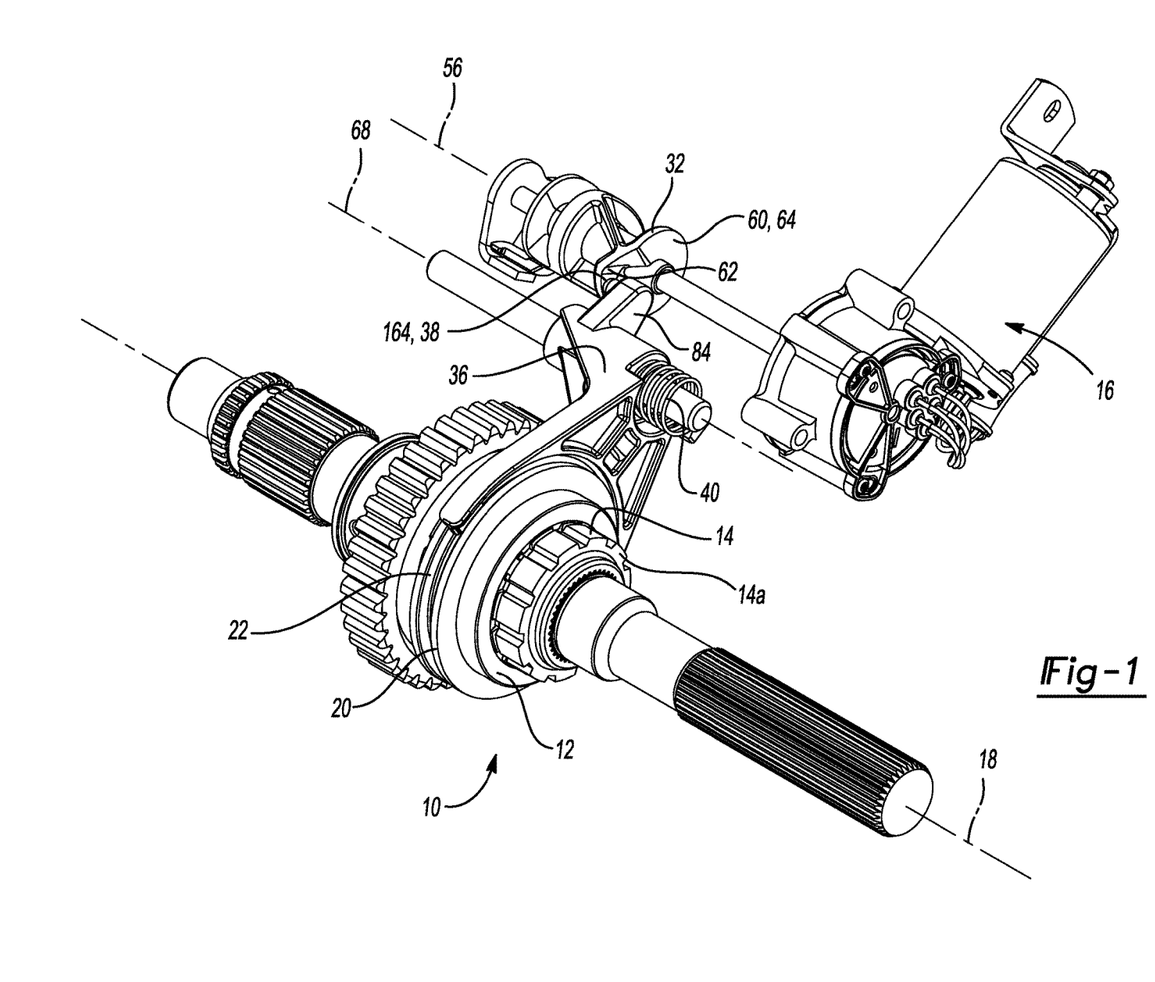
FIG. 1 is a perspective view of a portion of a transfer case having an exemplary actuator assembly constructed in accordance with the teachings of the present disclosure.
Figure 2:
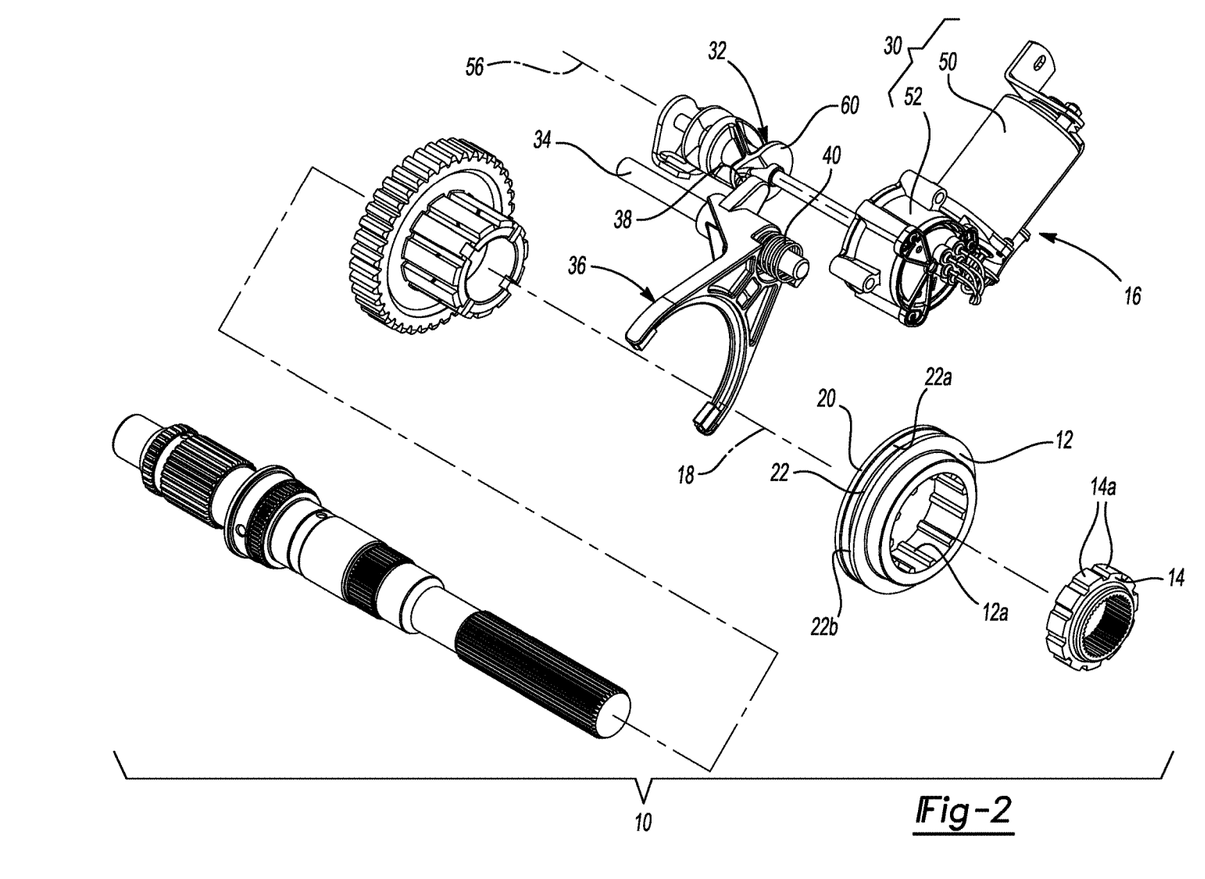
FIG. 2 is an exploded perspective view of the portion of the transfer case shown in FIG. 1.

With reference to FIGS. 1 and 2 of the drawings, a portion of a transfer case 10 is illustrated as including a first toothed member 12, a second toothed member 14 and an actuator assembly 16 that is constructed in accordance with the teachings of the present disclosure. The first and second toothed members 12 and 14 are rotatable about a common rotary axis (herein after referred to as the engagement axis 18). Additionally, the first toothed member 12 is axially movable along the engagement axis 18 between a first position, in which the first toothed member 12 is disengaged from the second toothed member 14 as shown in FIG. 1 (i.e., the first toothed member 12 is rotatable relative to the second toothed member 14), and a second position in which the first toothed member 12 is engaged to the second toothed member 14 (i.e., teeth 12a and 14a of the first and second toothed members 12 and 14, respectively, are engaged to one another so that the first and second toothed members 12 and 14 are rotatably coupled to one another). The first toothed member 12 can have an outer circumferential surface 20 with a circumferentially-extending groove 22 formed therein.

Figure 3:
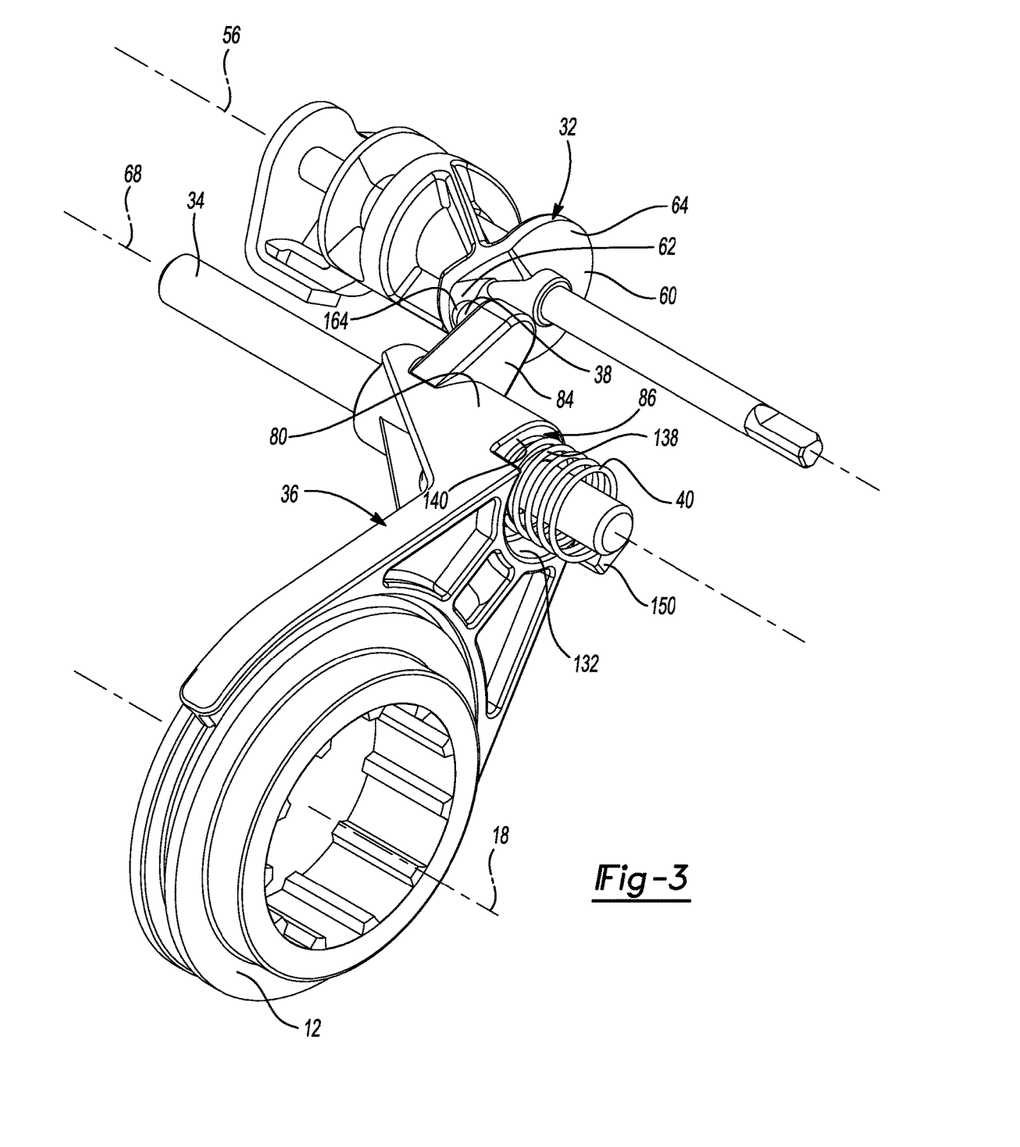
FIG. 3 is a perspective view of the actuator assembly shown in FIG. 1.

With reference to FIGS. 2 and 3, the actuator assembly 16 can comprise a motor assembly 30, a shift cam 32, an actuator shaft 34, an actuator structure 36, a cam follower 38, and a spring 40. The motor assembly 30 can include an electric motor 50 and a transmission 52 that is driven by the electric motor 50. An output of the transmission 52 can be drivingly coupled to the shift cam 32 to drive or rotate the shift cam 32 about a cam axis 56 that can be generally parallel to the engagement axis 18. The shift cam 32 can have an annular cam profile 60 that is disposed about the cam axis 56. The cam profile 60 can have a first profile portion 62 and a second profile portion 64 that is offset from the first profile portion 62 along the cam axis 56. The actuator shaft 34 can be a cylindrically shaped structure that can be disposed parallel to the engagement axis 18. The actuator shaft 34 can be fixedly coupled to an appropriate structure, such as a housing (not shown) into which the first and second toothed members 12 and 14 are housed. In the example provided, however, the actuator shaft 34 is slidably coupled to the housing for movement along an actuation axis 68.

Figure 4:
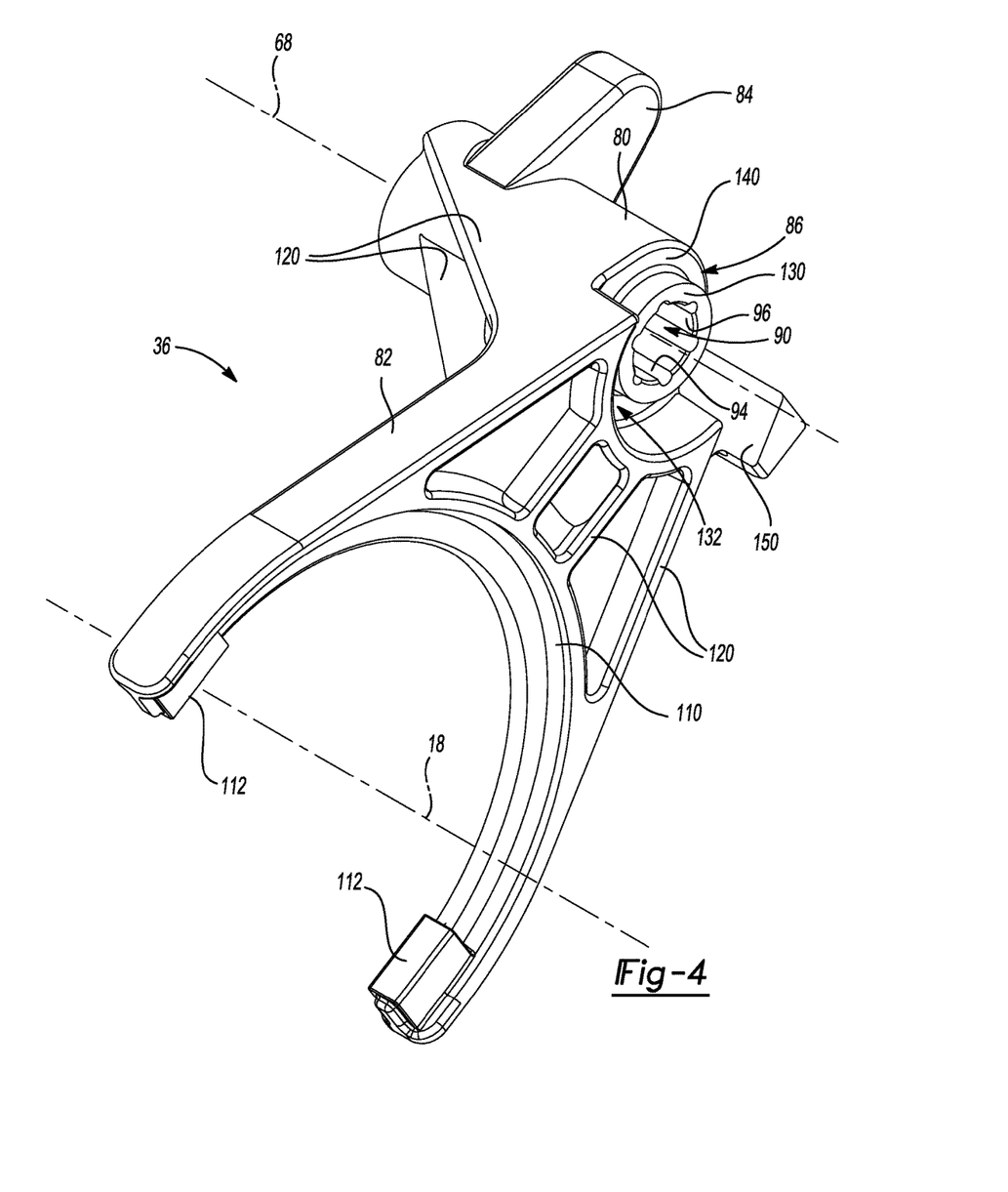
FIG. 4 is a perspective view of a portion of the actuator assembly illustrating an actuator structure in more detail.
Figure 5:
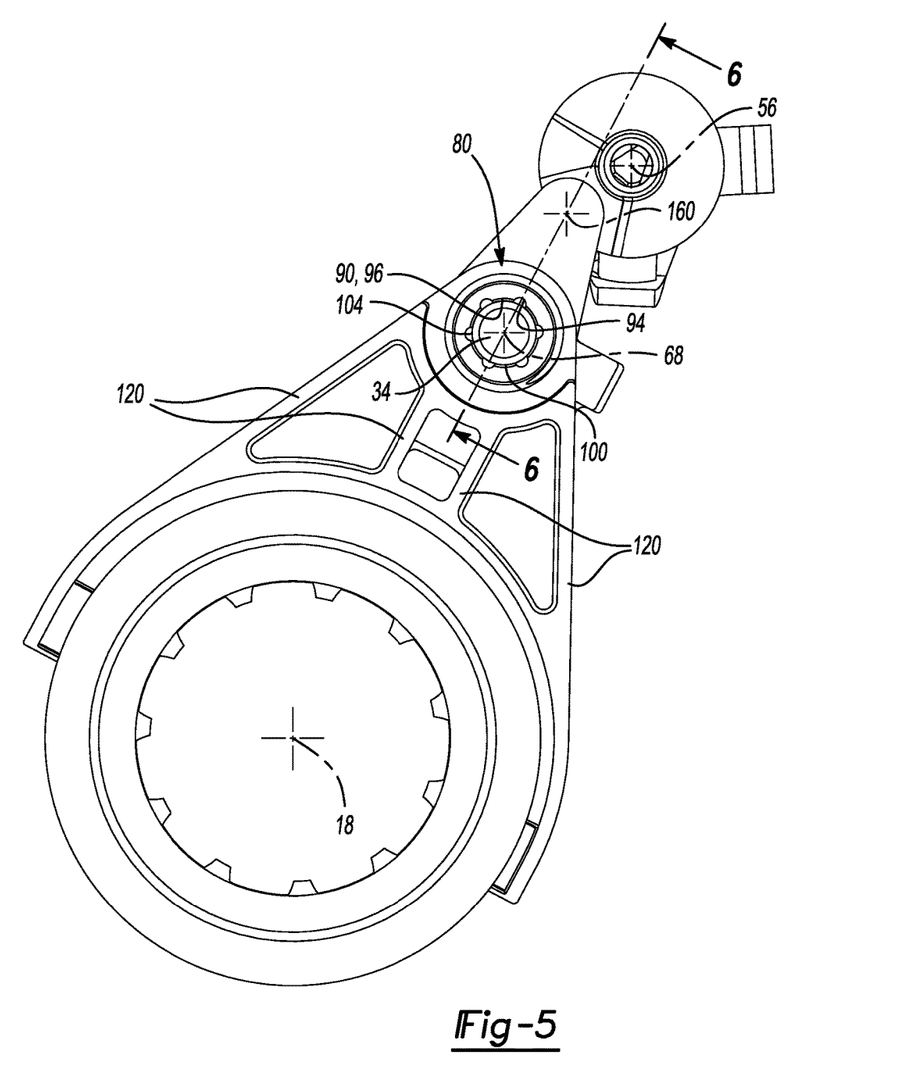
FIG. 5 is a side elevation view of the actuator assembly.

With reference to FIG. 4, the actuator structure 36 can be unitarily and integrally formed of an appropriate plastic material such as a thermoplastic. Exemplary plastic materials include polyesters, such as polybutylene terephthalate (PBT). The actuator structure 36 can define a sleeve structure 80, a fork structure 82, a follower mount 84 and a spring pocket 86. The sleeve structure 80 can be a generally tubular structure that can define a shaft aperture 90 that extends longitudinally along the actuation axis 68. The actuator shaft 34 (FIG. 2) can be received into the shaft aperture 90 so that the sleeve structure 80 is slidably disposed on the actuator shaft 34 for movement along the actuation axis 68. Accordingly, it will be appreciated that the actuator shaft 34 can be employed to orient the actuation axis 68 in a manner that is parallel to and radially offset from the engagement axis 18 (FIG. 2). If desired, a plurality of longitudinally extending grooves 94 can be formed into the surface 96 of the shaft aperture 90. The grooves 94 can be spaced circumferentially about the surface 96 of the shaft aperture 90 and can be employed to reduce the surface area of the shaft aperture 90 that contacts the actuator shaft 34 (to thereby reduce friction between the actuator structure 36 and the actuator shaft 34) and/or to aid in the transmission of lubrication between the surface 96 of the shaft aperture 90 and the outer diametrical surface of the actuator shaft 34 (FIG. 2). With additional reference to FIGS. 5 through 7, the sleeve structure 80 in the particular example provided is molded onto the actuator shaft 34. More specifically, the actuator shaft 34 includes a male splined segment 100, which can be formed on the actuator shaft 34 via a rolling operation, and the shaft aperture 90 and the grooves 94 are formed when the plastic material is overmolded onto the actuator shaft 34. In this configuration, the surface 96 of the shaft aperture 90 conforms to the minor diameter of the male splined segment 100 on the actuator shaft 34, the grooves 94 conform to the major diameter of the male splined segment on the actuator shaft 34, and each of the grooves 94 is configured to receive a corresponding one of the splines 104 on the male splined segment 100 on the actuator shaft 34. Configuration in this manner fixes the actuator structure 36 to the actuator shaft 34 in a way that inhibits relative axial and/or rotational movement there between.

In FIG. 4, the fork structure 82 can extend radially outwardly from the sleeve structure 80 and can define a U-shaped fork member 110 having a pair of tines 112 that are disposed about the engagement axis 18. In the particular example shown, the tines 112 of the U-shaped fork member 110 are spaced apart from the sleeve structure 80 along the actuation axis 68. The U-shaped fork member 110 can be received into the circumferentially extending groove 22 (FIG. 2) that is formed on the outer circumferential surface 20 of the first toothed member 12 (FIG. 2) so that the first toothed member 12 is rotatable relative to but translates with the actuator structure 36. The tines 112 are configured to directly engage annular sidewalls 22a, 22b (FIG. 2) formed on the first toothed member (FIG. 2).

In FIGS. 3 and 4, the follower mount 84 can extend radially outwardly from the sleeve structure 80. If desired, one or more gussets can be incorporated into the actuator structure 36 to aid in resisting deflection of the actuator structure 36. In the example provided, a plurality of gussets 120 extend between the sleeve structure 80 and the fork structure 82 to resist deflection of the fork structure 82 relative to the sleeve structure 80. The spring pocket 86 can be generally formed where the sleeve structure 80 and the fork structure 82 intersect one another. In the example provided, the spring pocket 86 comprises a boss 130, which is formed onto an axial end of the sleeve structure 80, and an annular groove 132 that is disposed about the boss 130. The boss 130 is sized in diameter to fit within the interior of the spring 40, which can be a helical compression spring. If desired, the boss 130 can be sized to engage the coils 138 on an associated end of the spring 40 to permit the end of the spring 40 to be fixedly coupled to the boss 130. The annular groove 132 is sized to receive the spring 40 therein and forms a spring shoulder 140 against which the associated end of the spring 40 is abutted. Optionally, a stop member 150 can be formed on or coupled to the actuator structure 36. The stop member 150 can be configured to contact another structure, such as the housing of the transfer case 10 (FIG. 1), when the actuator structure 36 is translated along the actuation axis 68 in a given direction to limit movement of the actuator structure 36 relative to the other structure in the given direction.

Figure 6:
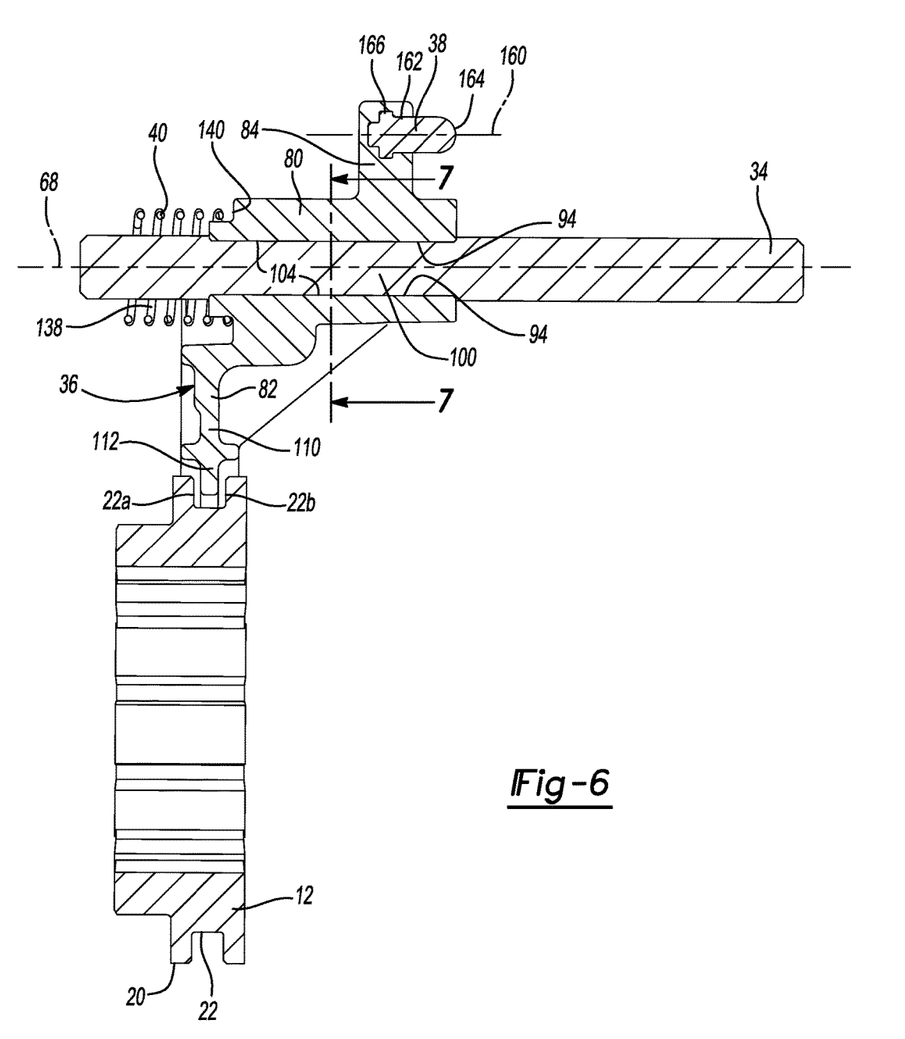
FIG. 6 is a sectional view taken along the line 6-6 of FIG. 5.
Figure 7:
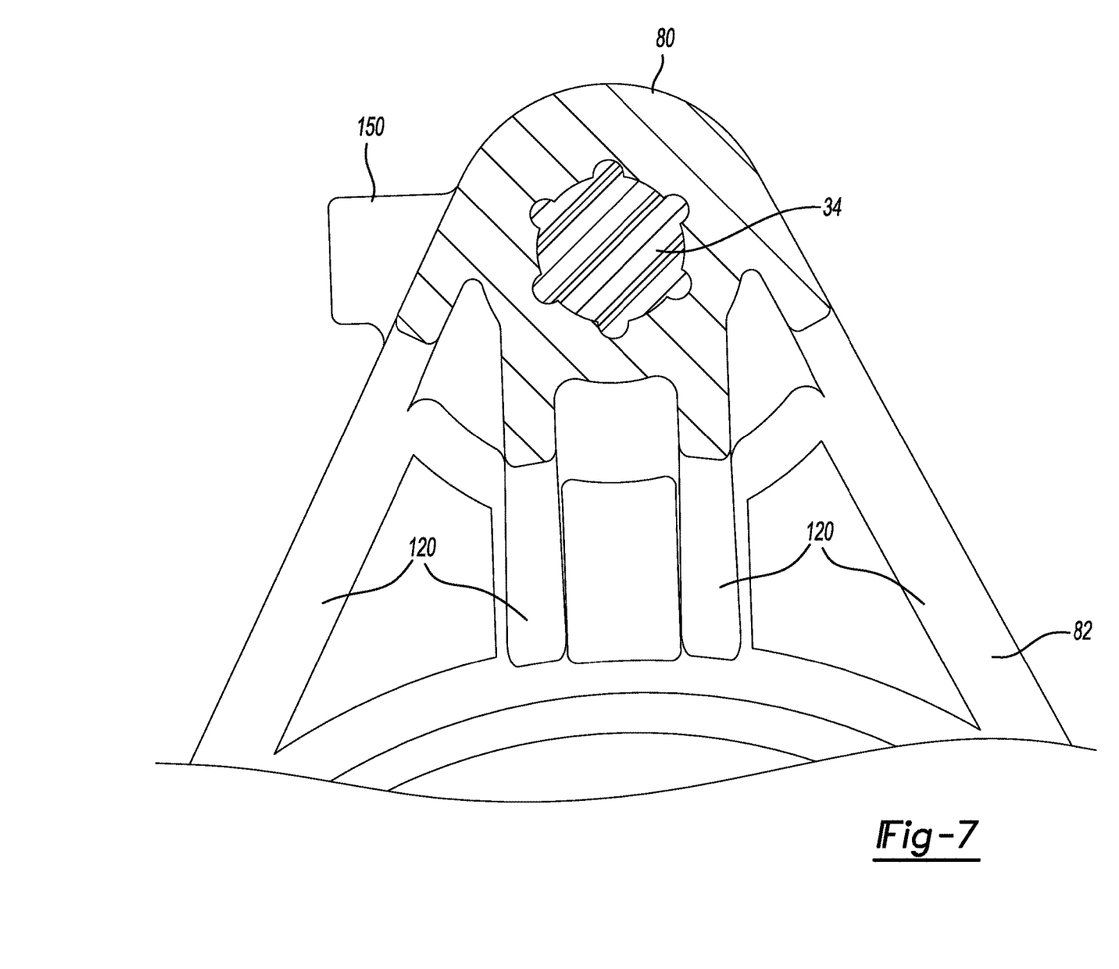
FIG. 7 is a sectional view taken along the line 7-7 of FIG. 6.

With reference to FIG. 6, the cam follower 38 can be formed of metal and can be partly encapsulated in the plastic material of the actuator structure 36. The cam follower 38 can extend from the follower mount 84 along a follower axis 160 that is parallel to the actuation axis 68. In the example provided, the cam follower 38 has a generally cylindrical follower body 162, a follower contact surface 164 and a rib or securing flange 166 that is disposed about the circumference of the follower body 162. The securing flange 166 is positioned along the length of the follower body 162 so as to be entirely disposed in the plastic material of the actuator structure 36 to thereby aid in axially fixing the cam follower 38 to the actuator structure 36. With additional reference to FIG. 5, the follower axis 160 can be rotated about (i.e., offset radially from) the actuation axis 68 relative to the engagement axis 18. In the example provided, the engagement axis 18, the actuation axis 68 and the follower axis 160 are parallel one another and disposed in a common plane, while the cam axis 56 is parallel to the plane but spaced apart therefrom.

With reference to FIGS. 1 and 3, the spring 40 can be a helical coil compression spring that can urge the actuator structure 36 along the actuation axis 68 in a direction that causes the follower contact surface 164 to engage the cam profile 60 of the shift cam 32.

With the follower contact surface 164 engaged to the first profile portion 62 of the cam profile 60, the motor assembly 30 can be operated to rotate the shift cam 32 about the cam axis 56 to position the second profile portion 64 of the cam profile 60 in contact with the follower contact surface 164 and thereby drive the cam follower 38 and the actuator structure 36 along the actuation axis 68 in a first direction. Since the first toothed member 12 is coupled to the actuator structure 36 for axial movement therewith, this motion of the actuator structure 36 also causes corresponding translation of the first toothed member 12 along the engagement axis 18 toward its second position.

With the follower contact surface 164 engaged to the second profile portion 64 of the cam profile 60, the motor assembly 30 can be operated to rotate the shift cam 32 about the cam axis 56 to position the first profile portion 62 of the cam profile 60 in contact with the follower contact surface 164. Force exerted by the spring 40 maintains the follower contact surface 164 in contact with the cam profile 60 and drives the cam follower 38 and the actuator structure 36 in a second direction along the actuation axis 68 that is opposite the first direction. Since the first toothed member 12 is coupled to the actuator structure 36 for axial movement therewith, this motion of the actuator structure 36 also causes corresponding translation of the first toothed member 12 along the engagement axis 18 toward its first position.

While the actuator structure 36 and the cam follower 38 have been illustrated and described herein in the context of a transfer case, it will be appreciated that the actuator structure 36 and cam follower 38 could be employed in an actuator assembly that is configured to operate a clutch or coupling in another type of power transmitting component. As such, it will be understood that the teachings of the present disclosure are not limited to transfer cases or even to automotive driveline components such as transfer cases.

Figure 8:
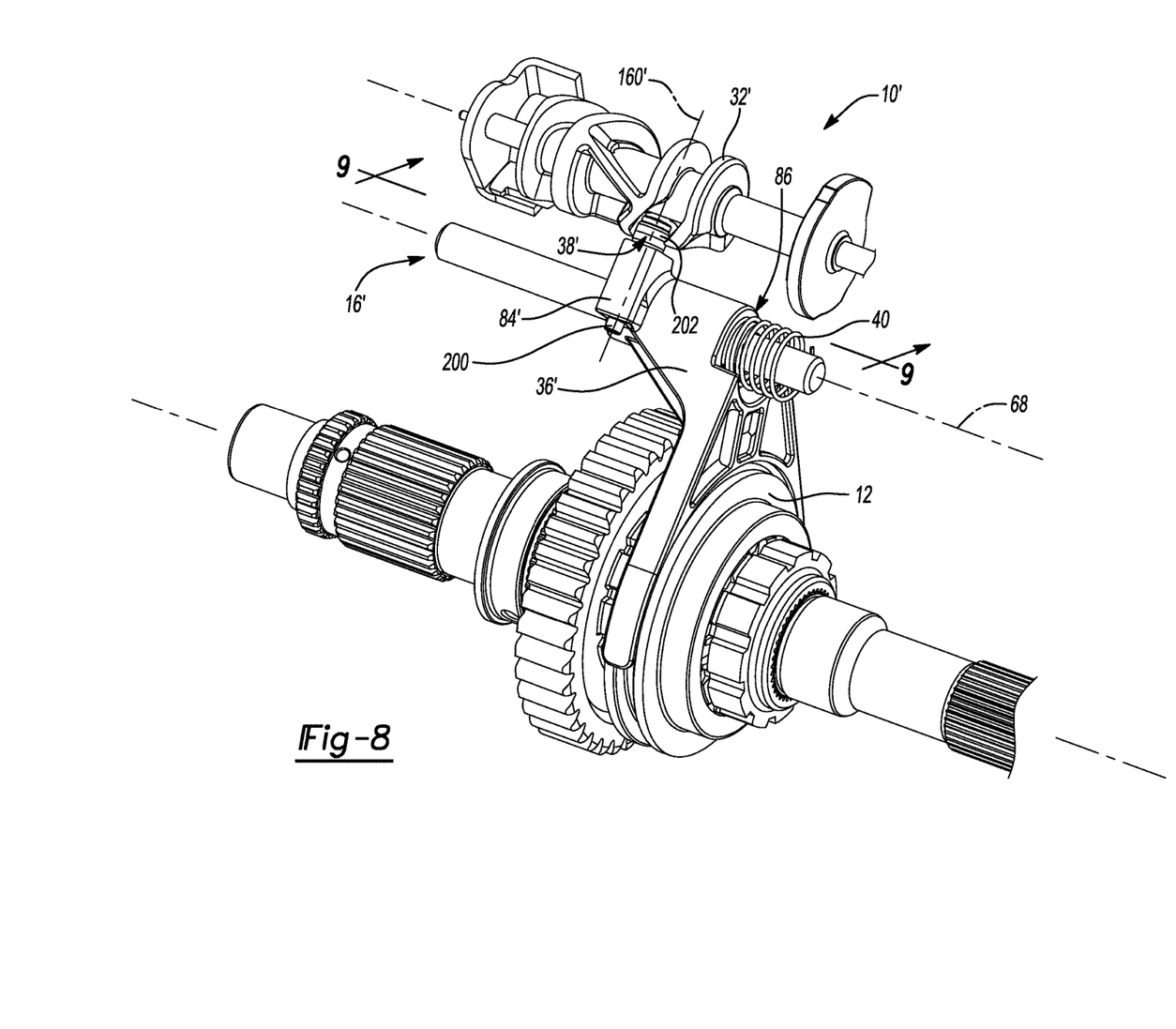
FIG. 8 is a perspective view of a portion of a transfer case having another exemplary actuator assembly constructed in accordance with the teachings of the present disclosure.

With reference to FIG. 8 of the drawings, a portion of a second transfer case 10' is illustrated as including another actuator assembly 16' that is constructed in accordance with the teachings of the present disclosure. The actuator assembly 16' is generally similar to the actuator assembly depicted in FIG. 1 and described in detail above and as such, a discussion of the portions of the actuator assembly 16' that are common with the actuator assembly 16 (FIG. 1) need not be provided herein. Briefly, the follower mount 84' on the actuator structure 36' is configured to orient the follower axis 160' transverse to the cam axis 56 and the actuation axis 68, the cam follower 38' includes a stem 200, a roller 202, and the shift cam 32' includes a cam profile 60' that extends helically about the outside diametrical surface of the shift cam 32'.

Figure 9:
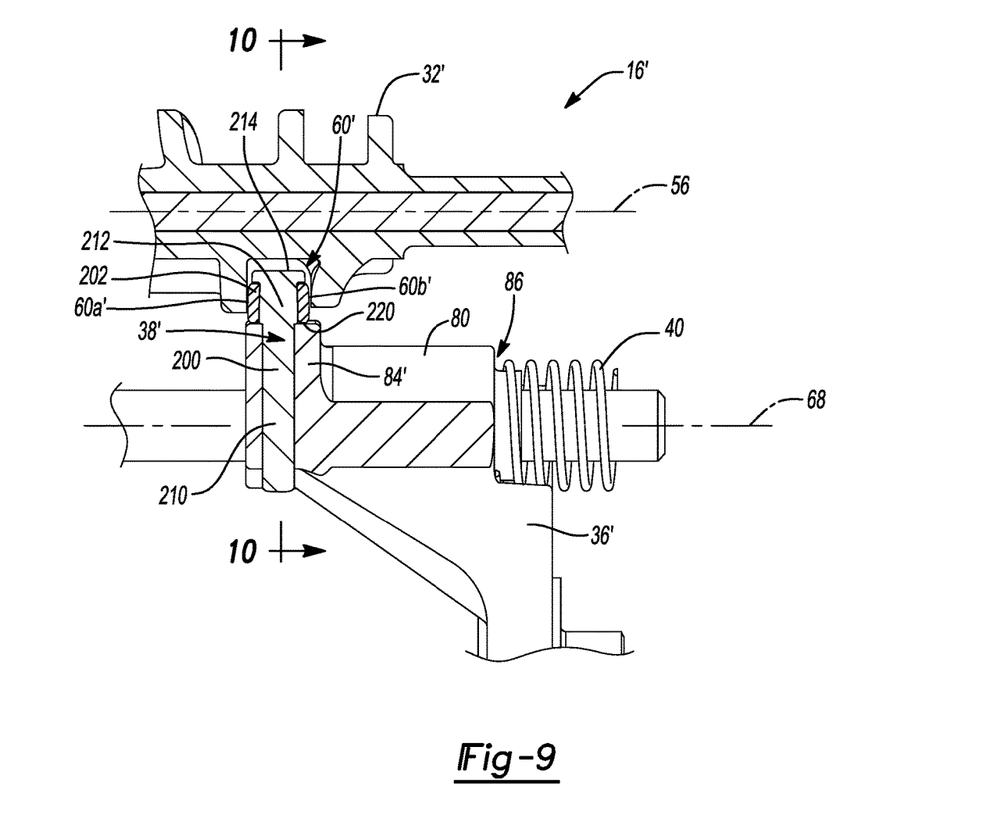
FIG. 9 is a section view taken along the line 9-9 of FIG. 8.
Figure 10:
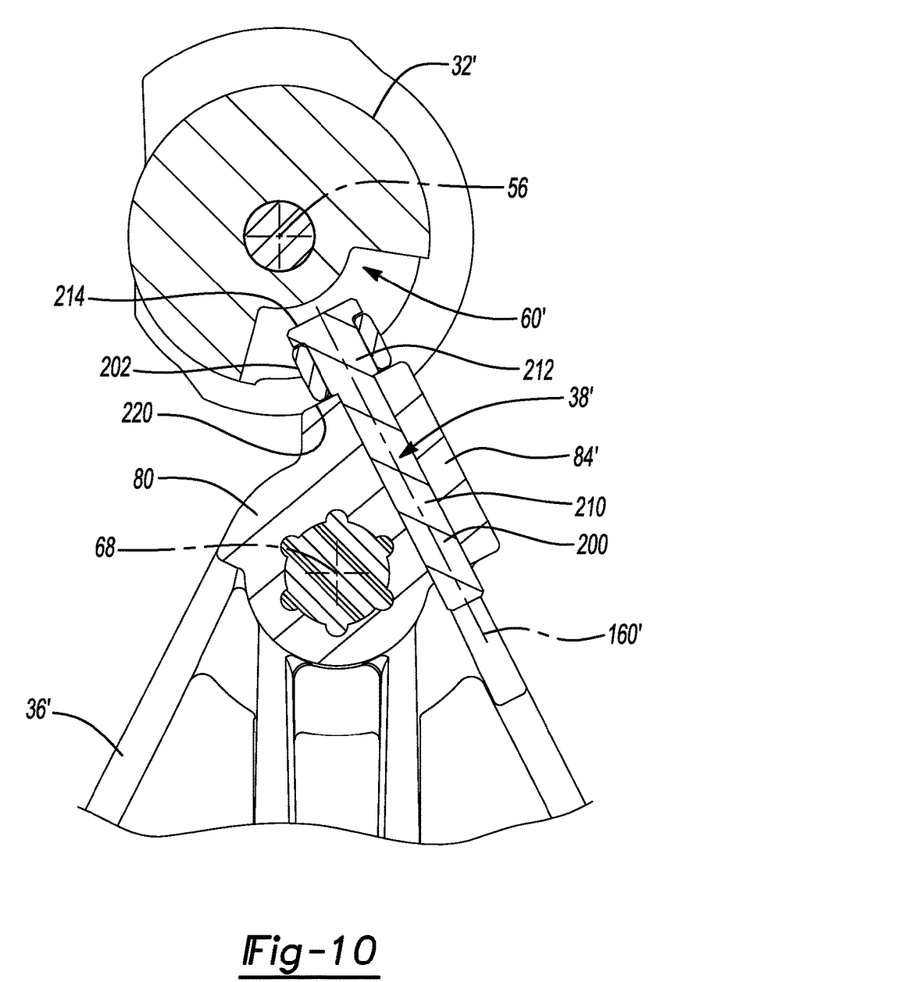
FIG. 10 is a section view taken along the line 10-10 of FIG. 9.

With reference to FIGS. 9 and 10, the stem 200 can be unitarily and integrally formed of a suitable material, such as metal, and can comprise a stem mount 210, a roller mount 212 and a head 214. The stem mount 210 can be fixedly coupled to the follower mount 84'. In the particular example provided, the plastic that forms the actuator structure 36' is molded onto the stem mount 210 to thereby partly embed or encapsulate the stem mount 210 into the plastic of the actuator structure 36'. The stem mount 210 is depicted as having a generally cylindrical shape, but it will be appreciated that various features, including holes, teeth and/or one or more flanges, for example, could be employed to aid in retaining the stem mount 210 to the follower mount 84' in a manner that inhibits or resists axial movement along or rotational movement about the follower axis 160'. The roller mount 212 can be coupled to the stem mount 210 and can project from the plastic that forms the actuator structure 36'. The roller mount 212 can have a cylindrical shape that is disposed concentrically about the follower axis 160' and can abut a confronting surface 220 formed on the follower mount 84'. The head 214 can be coupled to an end of the roller mount 212 opposite the stem mount 210 and is sized larger in diameter than the roller mount 212.

The roller 202 can be have a tubular shape and can be rotatably received onto the roller mount 212 axially between the head 214 and the confronting surface 220 on the follower mount 84'. The roller 202 is sized to be received into the cam profile 60' and engage opposite axial end walls 60a' and 60b' of the cam profile 60'.

It will be appreciated that rotation of the shift cam 32' about the cam axis 56 will cause corresponding axial movement of the follower 38' (and the actuator structure 36' therewith) along the actuation axis 68. It will also be appreciated that while the actuator assembly 16' has been illustrated as including a spring 40 and the actuator structure 36' has been illustrated as including a spring pocket 86, both the spring 40 and the spring pocket 86 could be eliminated if desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case comprising:
    an actuator assembly having an actuator structure and a cam follower, the actuator structure being unitarily formed of a plastic material, the actuator structure defining a sleeve structure, a fork structure and a follower mount, the sleeve structure defining a shaft aperture that extends longitudinally along an actuation axis, the fork structure extending radially outwardly from the sleeve structure and defining a U-shaped fork member having a pair of tines that are disposed about an engagement axis that is parallel to and radially offset from the actuation axis, the follower mount extending radially outwardly from the sleeve structure, the cam follower being formed of metal and being partly encapsulated in the plastic material of the actuator structure, the cam follower extending from the follower mount along a follower axis;
    wherein the follower axis is parallel to the actuation axis, and wherein the follower axis is rotated about the actuation axis relative to the engagement axis; and
    wherein the cam follower has a follower contact surface that is defined by a spherical radius.

2. The transfer case of claim 1, further comprising a shift cam that is rotatable about a shift cam axis that is parallel to the actuation axis, the shift cam having an axial end that defines a cam profile, the follower contact surface being engaged to the cam profile.

3. The transfer case of claim 1, wherein the tines of the U-shaped fork member are spaced apart from the sleeve structure along the actuation axis.

4. The transfer case of claim 3, wherein a spring pocket is formed between the sleeve structure and the fork structure and wherein the actuator assembly comprises a spring that is received in the spring pocket.

5. The transfer case of claim 1, wherein the actuator structure further comprises a plurality of gussets extending between the sleeve structure and the fork structure.

6. The transfer case of claim 1, wherein the actuator assembly further comprises a shaft that is received into the shaft aperture, the shaft being fixedly and non-rotatably coupled to the sleeve structure.

7. The transfer case of claim 1, wherein the cam follower includes a body and a rib that is disposed about the body axially along the follower axis between the follower contact surface and an opposite axial end of the cam follower, and wherein the rib is disposed in the follower mount.

8. The transfer case of claim 1, further comprising a first toothed member and a second toothed member that are rotatable about the engagement axis, the first toothed member having an outer circumferential surface with a circumferentially-extending groove formed therein, the tines of the U-shaped fork member being received into the circumferentially-extending groove, the first toothed member being axially movable along the engagement axis with the fork structure between a first position, in which the first toothed member is not engaged to the second toothed member, and a second position in which the first toothed member is engaged to the second toothed member.

9. The transfer case of claim 1, wherein the plastic material is a thermoplastic.

10. The transfer case of claim 9, wherein the thermoplastic is a polyester.

11. The transfer case of claim 10, wherein the polyester is a polybutylene terephthalate (PBT).

12. A transfer case comprising:
    an actuator assembly having an actuator structure and a cam follower, the actuator structure being unitarily formed of a plastic material, the actuator structure defining a sleeve structure, a fork structure and a follower mount, the sleeve structure defining a shaft aperture that extends longitudinally along an actuation axis, the fork structure extending radially outwardly from the sleeve structure and defining a U-shaped fork member having a pair of tines that are disposed about an engagement axis that is parallel to and radially offset from the actuation axis, the follower mount extending radially outwardly from the sleeve structure, the cam follower being formed of metal and being partly encapsulated in the plastic material of the actuator structure, the cam follower extending from the follower mount along a follower axis;

wherein the follower axis is transverse to the actuation axis; and wherein the follower comprises a stem and a roller, wherein the stem is fixedly coupled to the actuator structure and wherein the roller is rotatably disposed on the stem.

13. The transfer case of claim 12, wherein the actuator structure further comprises a plurality of gussets extending between the sleeve structure and the fork structure.

14. The transfer case of claim 12, wherein the actuator assembly further comprises a shaft that is received into the shaft aperture, the shaft being fixedly and non-rotatably coupled to the sleeve structure.

15. The transfer case of claim 12, wherein the cam follower includes a body and a rib that is disposed about the body axially along the follower axis between the follower contact surface and an opposite axial end of the cam follower, and wherein the rib is disposed in the follower mount.

16. The transfer case of claim 12, further comprising a first toothed member and a second toothed member that are rotatable about the engagement axis, the first toothed member having an outer circumferential surface with a circumferentially-extending groove formed therein, the tines of the U-shaped fork member being received into the circumferentially-extending groove, the first toothed member being axially movable along the engagement axis with the fork structure between a first position, in which the first toothed member is not engaged to the second toothed member, and a second position in which the first toothed member is engaged to the second toothed member.

17. The transfer case of claim 12, wherein the plastic material is a thermoplastic.

18. The transfer case of claim 17, wherein the thermoplastic is a polyester.

19. The transfer case of claim 18, wherein the polyester is a polybutylene terephthalate (PBT).

* * * * *